Feb. 8, 1966  H. G. THOMPSON  3,233,682
WEIGHT TRANSFER IMPLEMENT HITCH
Filed July 29, 1963  2 Sheets-Sheet 1
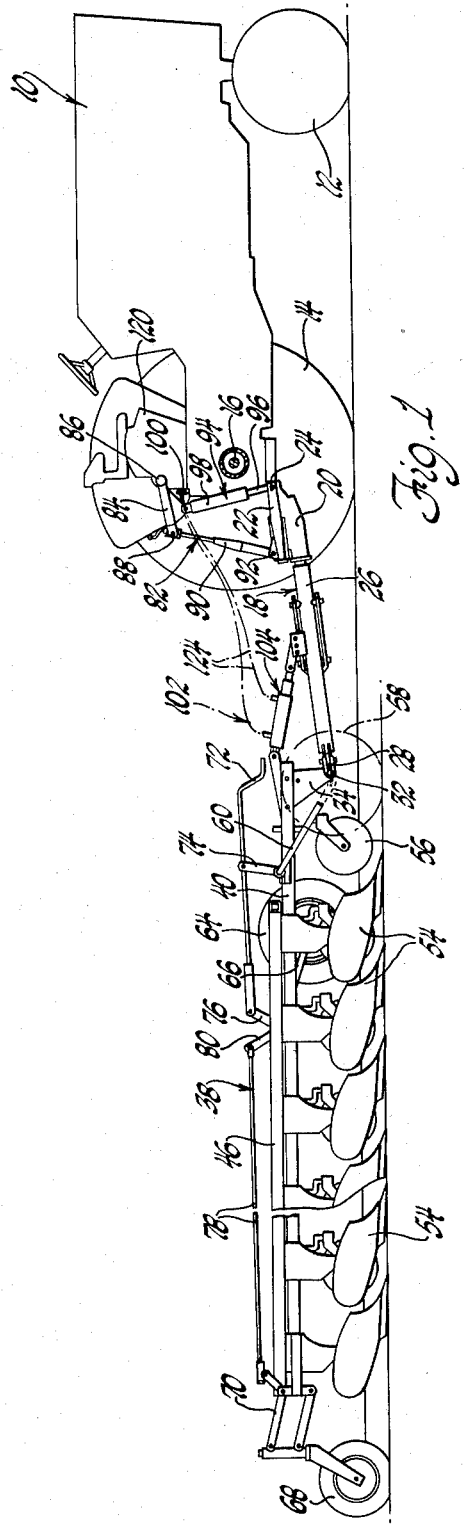
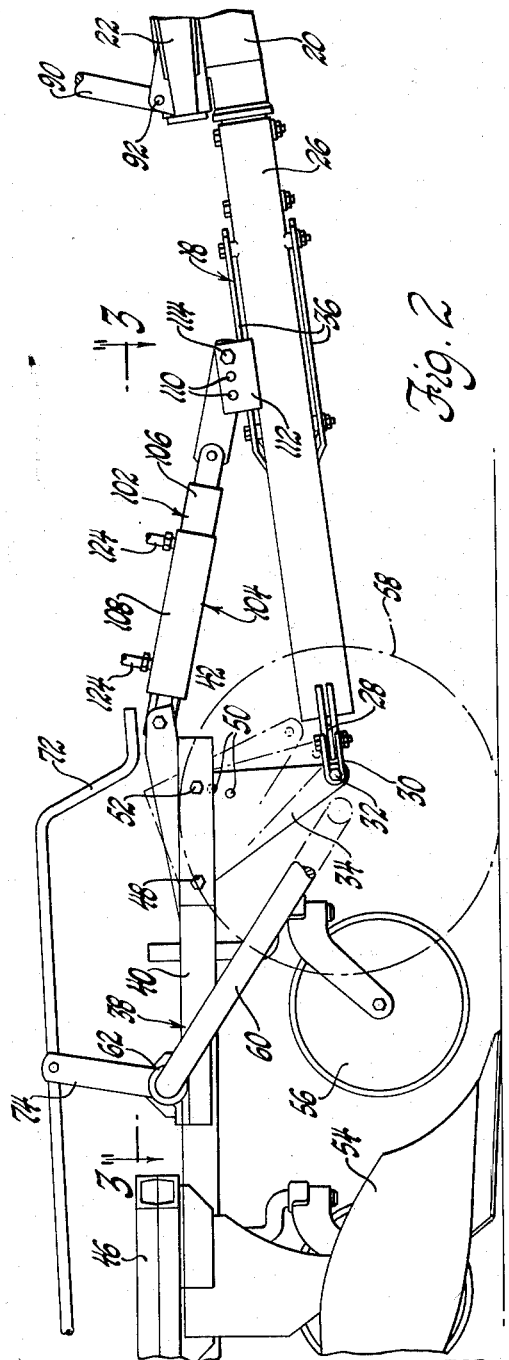
INVENTOR.
Howard G. Thompson
BY
Barnard, McGlynn & Reising
ATTORNEYS INVENTOR.
Howard G. Thompson
BY
Barnard, McGlynn & Leising
ATTORNEYS United States Patent Office 3,233,682
Patented Feb. 8, 1966

3,233,682
WEIGHT TRANSFER IMPLEMENT HITCH
Howard G. Thompson, Livonia, Mich., assignor to Massey-Ferguson Incorporated, Detroit, Mich., a corporation of Maryland
Filed July 29, 1963, Ser. No. 298,338
15 Claims. (Cl. 172—7)

This invention relates to vehicular combinations of the type including a powered prime mover including traction wheels pivotally connected to one portion of a drawbar or hitch means extending rearwardly therefrom and having another portion thereof pivotally connected to a wheeled drawn implement, and is particularly characterized by improved means for transferring preselected or predetermined amounts of the weight of the drawn implement to the traction wheels of the prime mover while at the same time accommodating relative pivotal movement between the prime mover, drawbar and drawn implement about their respective pivotal connections.

Agricultural tractors and similar prime movers have heretofore been equipped with hydraulically power operated hitch mechanisms totally or wholly mounting or supporting a trailing non-wheeled agricultural tool or implement for the purpose of drawing the tool or implement behind the tractor or prime mover over a surface to be worked, while controlled operation of the hydraulic power unit has enabled the tool or implement to be bodily raised from and lowered to the surface being worked. Of equal if not greater significance, however, is the fact that such a hitch mechanism has permitted transferring a preselected substantial portion of the weight of the drawn tool or implement and the usual counter-balancing weight of the front end of the tractor onto the rear traction or drive wheels of the latter.

Thus, the tractive effort applied by the rear driving wheels of the tractor may be increased substantially by transfer of weight or load thereto in this manner, and without resort to adding supplemental rear wheel weights to the tractor which would also result in an increase in rolling resistance and reduce the grade climbing ability of the tractor-implement combination. As a consequence, it has been possible to design relatively light weight tractors for fully or totally mounting or supporting implements or tools therebehind wherein the aforementioned hitch mechanism is operable to transfer weight or load to the rear driving wheels of a tractor to provide the necessary tractive effort in various kinds of soils and under various operating conditions as will be readily apparent to those acquainted with the art.

On the other hand, such a relatively light weight tractor does not exhibit the same advantages with respect to tractive effort when a standard drawbar or hitch is used with heavy draft pull-behind type tools or implements; that is, and as compared to the fully mounted tools or implements aforementioned, implements or tools equipped with their own ground-engaging support wheels. More specifically, although it may be possible to transfer some of the weight of the front end of the drawn implement through a hitch mechanism of the type aforementioned to the towing tractor, the amout of such weight which can be so transferred while still maintaining the implement, such as a plow, in a desired working relationship, such as plowing depth, to the surface being worked is limited. As a consequence, it has not been possible to transfer sufficient amounts of the weight and other loads imposed on such heavy draft pull-behind tools to the traction wheels of the tractors to provide the tractive effort required under various operating conditions. Thus, in the past, when such heavy draft pull-behind tools or implements had to be used with tractors of the type aforementioned, the required tractive effort at the rear wheels of the tractor has usually been achieved by hanging heavy weights on the rear of the tractor. Adding rear wheel weights in this manner has, of course, necessitated the addition of a correspondingly sufficient amount of weight to the front end of the tractor for counterbalancing purposes. As a consequence of the addition of such weights as aforementioned, the tractor is over-burdened and its efficiency is reduced when towing either the heavy pull-behind tools as aforementioned or even fully mounted tools as previously referred to.

In view of the foregoing considerations, the present invention contemplates a tractor-drawn implement combination of the type comprising a wheeled prime mover, a drawn tool or implement equipped with its own ground-engaging support wheels, and hitch means or a drawbar having spaced portions thereof respectively pivotally connected on first and second horizontal transverse axes to the prime mover and drawn implement for relative pivotal movement therebetween in a substantially vertical plane, and is particularly characterized by load or weight transfer means operable to transfer a predetermined amount of the weight or load of the implement through the hitch means or drawbar to the traction wheels of the prime mover while concurrently permitting the prime mover, hitch means or drawbar and implement to pivot relative to each other about the aforementioned axes as, for example, while the vehicular combination pitches in a vertical plane over irregular terrain.

More particularly, the present invention is characterized by an agricultural tractor or similar prime mover having a rearward portion thereof connected on a first horizontal transverse pivot axis to a forward end of a rearwardly extending hitch means or drawbar having the rearward end thereof similarly pivotally connected on a second horizontal transverse axis to a forward portion of a trailing and drawn implement, such as a plow, a first fluid pressure operated jack or ram means including relatively reciprocable piston and cylinder elements operatively connected between the prime mover and the hitch means, preferably through intermediary draft linkages, and being operable to transfer loads imposed on the hitch means to the traction wheels of the prime mover while permitting relative pivotal movement between the prime mover and the hitch means about the aforementioned first axis, a second fluid pressure operated jack or ram means including relatively reciprocable piston and cylinder elements operatively pivotally connected between the hitch means and the implement and being operable to transfer load from the latter to the hitch means and to permit relative pivotal movement between the implement and hitch means about the aforementioned second axis, and control means operatively interconnecting the first and second jack or ram means to maintain the respective loads or weights transferred therethrough substantially constant during relative pivotal movement of the prime mover, implement and hitch means relative to each other about the axes aforementioned.

More specifically, it is preferred that the aforementioned control means take the form of a fluid pressure power unit connected in parallel to the aforementioned first and second jack or ram means, and in which the power unit is characterized by a source of fluid under pressure, a sump, and valve means for controlling supply of fluid under pressure and exhaust of pressure from the parallel flow connections to the aforementioned jack means, whereby a preselected pressure is automatically maintained within each of the rams or jacks to maintain the forces applied therethrough and, hence, the loads transferred therethrough substantially constant while permitting relative pivotal movement of the prime mover, hitch means and implement about the respective axes aforementioned.

In accordance with one preferred embodiment thereof, the invention is further particularly characterized by the fact that the hitch means is pivotally connected to the towed implement on the second axis aforementioned through a hitch member which, in turn, is adjustably mounted on the implement for movement relative thereto between a plurality of fixed positions to vary the vertical angle between the implement and the hitch means about the second axis aforementioned. As a result, and apart from the preselected pressure applied to the second jack as aforementioned to control weight transfer therethrough, the basic geometry of the connection of the hitch means to the implement may be varied in accordance with the weight and other characteristics of a given implement to be attached to the hitch means to correspondingly additionally vary loads or weights to be transferred from the implement to the hitch means and ultimately to the tractor.

According to another preferred form of the invention, such additional variation of loads to be transferred from the implement to the hitch means and ultimately to the traction wheels of the tractor may be accomplished by adjustably mounting the aforementioned second jack means to one or the other, and preferably both, of the implement and the hitch means and relative to the second axis aforementioned to vary the moment arm of the force applied through the second jack means relative to the second axis.

In order to facilitate an understanding of the invention, two embodiments thereof will now be described with reference to the drawings in which:

FIGURE 1 is a side elevational view, partially schematic in nature, of an agricultural tractor coupled in towing relation to a plow through a hitch mechanism, and illustrates one preferred embodiment of the invention;

FIGURE 2 is an enlarged fragmentary view of a portion of FIGURE 1, and illustrates certain details of the mechanism for transferring load from the plow to the hitch mechanism for ultimate transferral to the tractor;

Figure 3:
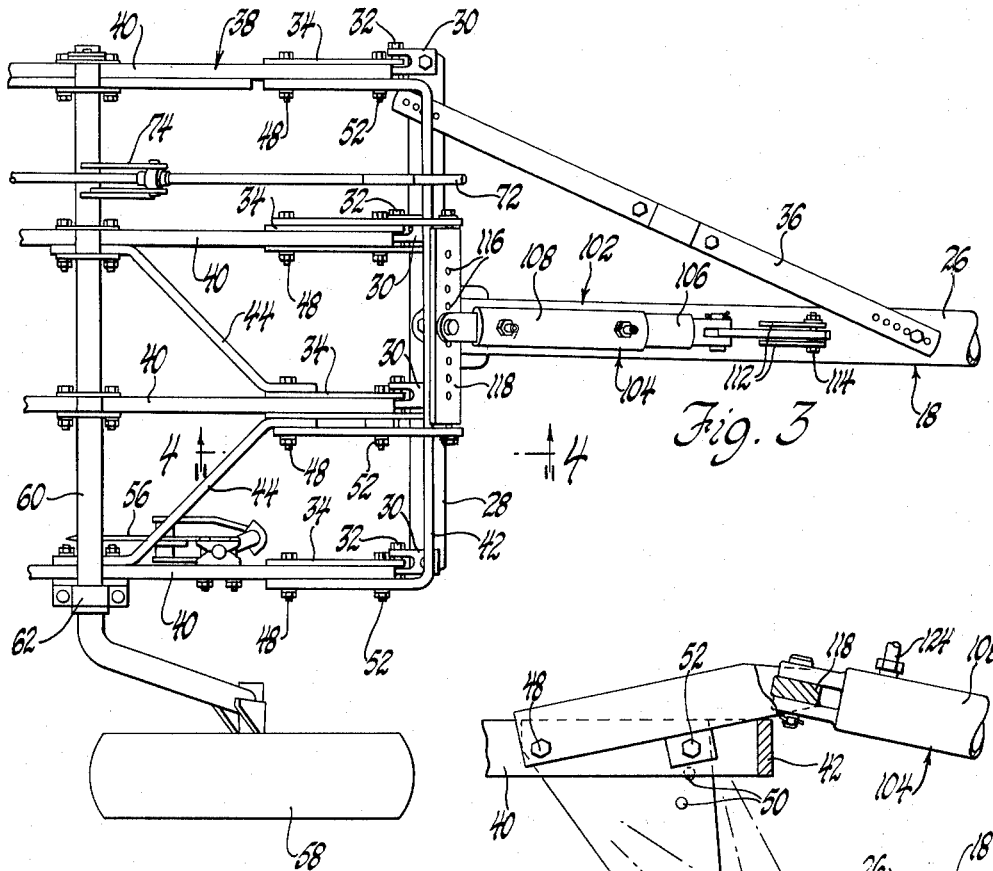
FIGURE 3 is a view taken on line 3—3 of FIGURE 2.
Figure 4:
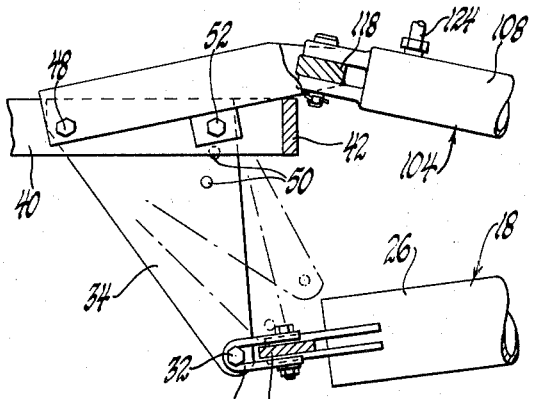
Figure 5:
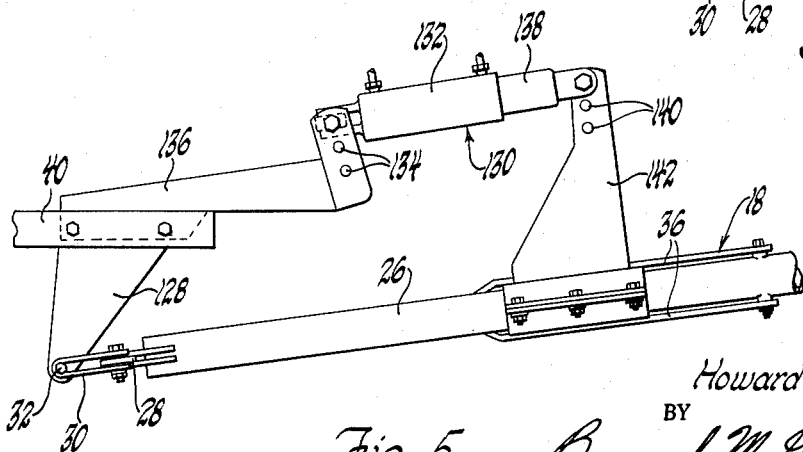

FIGURE 4 is a further enlarged fragmentary view of a portion of FIGURE 2 particularly illustrating further details of the hitch connection between the drawbar of the hitch mechanism and the drawn plow; and FIGURE 5 is a fragmentary view of a portion of FIGURE 2, but illustrates another preferred embodiment of the invention particularly involving an adjustable mounting for the load or weight transferring mechanism operating between the drawn plow and the drawbar of the hitch mechanism to which it is coupled.

Referring now to the drawings, the agricultural tractor or other suitable prime mover indicated generally at 10 comprises the usual front ground-engaging support wheels 12 and the rearward traction wheels 14 suitably drivingly coupled to the drive axle 16 to which power is supplied from the engine of the tractor in a conventional manner to propel the tractor and the implement drawn thereby over soil to be worked.

A hitch mechanism indicated generally at 18 comprises the usual suitable yoke member 20, including laterally spaced link members 22 secured rigidly thereto, only one of such links being shown, suitably pivotally connected to a rearward portion of the frame of a tractor on a horizontal transverse pivot axis indicated at 24 just rearwardly and below the drive axle 16. A longitudinally extending drawbar 26 has its forward end suitably secured to the yoke member 20 generally midway between the traction wheels 14 so as to be confined with the yoke for pivotal movement in unison with the latter in a vertical plane about the axis 24, the aforementioned forward end of the drawbar preferably being rotatably journaled in the yoke member for rotation about the axis of the drawbar to accommodate relative transverse pitching movement of the tractor and plow to be described. The rearward end of the drawbar is suitably secured in the usual manner to a transversely extending elongated hitch bar 28 provided with a plurality of apertures therealong for receipt of conventional fasteners for a plurality of strap members 30 respectively pivotally connected about a horizontally transverse pivot axis indicated at 32 to a plurality of hitch plates 34 adjustably secured in a manner to be described to a drawn plow. A lateral bracing member 36 is adjustably supported between drawbar 26 and hitch bar 28 in the usual manner.

A drawn plow is indicated generally at 38 and comprises a suitable number of longitudinally extending laterally spaced plow beams 40 suitably rigidly interconnected in the usual manner by such as the front truss frame 42, heavy duty braces 44 and the "backbone" frame 46 rigidly secured across the top of the complete plow, and particularly the plow beams thereof, in the usual manner to result, in essence, in a rigidly interconnected plow frame structure.

At this juncture, it may be noted that one of the aforementioned hitch plates 34 is provided for each of the plow beams 40 and depends therefrom, and the upper end of each hitch plate is adjustably pivotally mounted on its associated plow beam on a horizontal transverse axis indicated at 48 and is provided with a plurality of apertures 50 cooperating upon alignment with an aperture in the associated plow beam to receive a suitable fastener 52 to lock each of the hitch plates at different fixed angular positions with respect to the forward end of the plow as indicated in solid and phantom lines in FIGURES 2 and 4. Thus, by adjusting the position of each of the hitch plates 34, it is possible to obtain a straight line of pull from the tractor center-of-draft to the plow center-of-resistance. Furthermore, and as will appear more fully hereinafter, the hitch plates 34 may be adjusted as aforementioned to change the hitch geometry between the drawbar 26 and the plow 38 about axis 32 in accordance with the size and weight distribution of a given plow or other implement to be towed behind the tractor, and the weight or load transfer desired from the plow through the hitch means 18 to the rear wheels of the tractor.

As will be apparent, the plow further includes in the usual manner a suitable number of plows 54, coulter wheels 56 as desired or required, the ground-engaging furrow wheel 58 suitably supported on the suspension arm 60 extending transversely of the plow frame and suitably rotatably supported on the plow beams 40 as by bearings 62, the land wheel 64 similarly suitably rotatably supported on the suspension arm 66 likewise suitably rotatably supported transversely of the plow frame longitudinally rearwardly from the suspension arm for the furrow wheel 58, and a fully castoring rear furrow wheel 68 suitably mounted through the parallelogram-type linkage means 70 to the rear of the plow frame. A conventional manually operated screw crank 72 extends between the crank arms 74 and 76 respectively rigidly secured to the suspension arms 60 and 66 for the furrow and land wheels, while the conventional adjustable rod member 78 has its opposite ends suitably secured respectively to another crank arm 80 secured to the suspension arm 66 for the land wheel 64 and the linkage 70 controlling the rear furrow wheel 68.

While not shown, it will of course be appreciated that a hydraulic ram may be mounted on the plow frame and connected through a suitable crank arm to the suspension arm 66 for the land wheel 64 whereby, upon extension and retraction of the ram under control of suitable valving adjacent the operator's seat on the tractor, the land wheel suspension arm 66 may be pivoted resulting simultaneously, through the screw crank 72 and rod 78, in pivoting of the suspension arm 60 for the front furrow wheel 58 and the linkage 70 for the rear furrow wheel 68 to adjust the height of the plow frame relative to the soil to be worked, and between lowered working and raised transport positions. The screw crank 72 may be manipulated independently of such a ram to make a final transverse leveling adjustment of the plow frame by moving the front furrow wheel 58 independently of the land wheel 64 while, in similar fashion, the rod 78 may be finally adjusted to level the plow longitudinally.

At this juncture it may be noted that the forward end of the yoke member 20 and, consequently, the drawbar 26 is free to move vertically relative to the rearward portion of the tractor 10 in a vertical plane about the horizontal transverse axis 24 to accommodate relative pitch between the hitch means 18 and the tractor 10 as the tractor-implement combination traverses irregular terrain. In similar fashion, and with the hitch plates 34 adjusted to a fixed position on the forward end of the plow frame, similar relative pivotal movement under similar circumstances is permitted between the plow frame and the rearward portion of the drawbar about the horizontal transverse axis 32. Such relative pivotal movement between the tractor 10, hitch means 18 and plow 38 under such circumstances is still permitted in accordance with this invention and in a manner to be described hereinafter by a load or weight transfer mechanism now to be described which operates automatically to transfer a preselected and substantial portion of the load or weight of the plow 38, and particularly from the rearward portion thereof, and a portion of the weight otherwise imposed on the ground through the front tractor wheels 12 to the rear traction wheels 14 thereof.

Thus, the numeral 82 generally indicates a first load transfer and draft linkage mechanism which comprises two sets of linkages and associated hydraulically power actuated ram or jack, one such set being associated with each of the link members 22 of the hitch mechanism 18 aforedescribed. Since such linkages are identical, only one is shown and may be seen from FIGURE 1 to comprise an upper link 84 having one end thereof suitably pivotally connected on a fixed axis as indicated at 86 to a rearward portion of the tractor, the other end being suitably pivotally connected at 88 to the upper end of a drop link 90 having the lower end thereof pivotally connected at 92 to a rearward portion of the associated link member 22. As will be obvious to those acquainted with this art, the drop links 90 preferably include two relatively reciprocably adjustable elements for the purpose of adjusting the distance between the pivot connections 88 and 92, and the geometry of the over-all linkage. A suitable fluid pressure operated jack of the double acting variety is indicated at 94 and includes the relatively reciprocable piston and cylinder elements 96 and 98 respectively pivotally connected to the tractor on the pivot axis 24 aforementioned and to the upper link 84 on the pivot axis 100. As will be apparent, extension of the jack 94 operates through the linkage aforedescribed to force the hitch means 18, and particularly the drawbar 26 thereof, to swing upwardly clockwise about the pivot axis 24 in FIGURE 1 and, hence, upon holding the jack in any given extended position under the weight or load imposed by the hitch means 18, such load or weight is transmitted through the jack to the pivot connection 24, the rearward portion of the tractor and to the traction wheels 14 thereof.

The numeral 102 generally indicates a second load transfer mechanism comprising a fluid pressure operated jack of the double acting variety indicated generally at 104 and including the piston and cylinder elements 106 and 108, respectively, the piston element being adapted to be pivotally fixedly connected in any one of a plurality of locating holes 110 in a bracket 112 fixed to the drawbar 26 by means of a fastener 114. The cylinder element is adapted to be pivotally connected in any one of a plurality of locating holes 116 carried by a bracket 118 suitably supported on the plow frame. As will be apparent, particularly from FIGURES 1 and 2, retraction of the jack 104 operates to bodily lift the plow 38 cantilever fashion relative to the drawbar 26 about the axis 32 and, consequently, in any selected adjusted position of the jack, a predetermined or preselected load or portion of the weight of the plow is transferred through the jack 104 to the drawbar 26. Naturally, such load or weight is transmitted through the drop links 90 to the upper links 84 of the load transfer mechanism 82 and through the jack 94 to the rear traction wheels of the tractor as aforedescribed.

The tractor 10 is provided with a suitable hydraulic power unit indicated schematically at 120 in FIGURE 1, such power unit not being illustrated in detail since it may be of well-known and commercially available construction. Suffice it to say at this point that such a power unit typically comprises a suitable power driven hydraulic pump and circuit means including selector valve means for supplying fluid under pressure to and exhausting fluid from the jack 94 to control extension and retraction of the latter and the loads consequently transferred therethrough to the rear traction wheels of the tractor. More specifically, such a power unit is particularly characterized by the fact the selector valve associated therewith may be initially suitably positioned to supply fluid under pressure to the jack 94 to select a particular force to be transmitted therethrough under a certain set of operating conditions and, hence, the load which is transferred from the hitch mechanism 18 to the rear portion of the tractor. Thereafter, once such a force and load is so selected, the selector valve is suitably automatically positioned subsequently to supply fluid to the jack if the pressure therein and, hence, the force and load transmitted therethrough should tend to decrease and to exhaust fluid therefrom if the pressure therein and, hence, the force and load transmitted therethrough tends to increase as would be occasioned, for example, by relative pivotal movement of the tractor 10 relative to the hitch means 18 about the pivot axis 24. As aforementioned, such power units are known and commercially available, and reference may be made to United States Patent No. 2,627,796 entitled "Controllable Load Transfer Hitch for Tractors" issued to Ernest V. Bunting on February 10, 1953, for a detailed disclosure of one such type of power unit.

However, unlike prior constructions, the opposite ends of the double acting jack 104 are connected, as indicated schematically in phantom lines at 124 in FIGURE 1, through power unit 120 in parallel with the opposite ends of the jack 94. Hence, the power unit 120 operates as aforedescribed to select the over-all load which it is desired to transfer from the plow 38 to the hitch means 18 and from the latter to the rear traction wheels of the tractor 10. Once a particular amount of load is preselected, any variation in the pressures in and, hence, the forces transmitted through the respective jacks cause the power unit 120 to respond automatically to either supply or exhaust fluid from the parallel fluid system interconnecting the respective jacks to maintain the pressures therein and, hence, the loads transferred therethrough substantially constant.

In operation, the drop links 90 may be adjusted as desired or required to set the geometry of the draft linkages associated with the load transfer mechanism 82 in accordance with the loads to be transferred therethrough to the tractor. In similar fashion, the hitch plates 34 may likewise be adjusted angularly relative to the plow beams 40 as previously described to modify the geometry between the hitch axis 32 and the respective connections of the jack to the bracket 118 and the drawbar 26 in accordance with the size and weight distribution of the particular implement, in this case a plow, being towed. After these initial settings are made, fluid under pressure is supplied from the power unit 120 to the respective jacks 94 and 104 to extend the jack 94 and contract the jack 104 to a desired amount. As a result, the plow 38 is bodily lifted upwardly relative to the drawbar 26 and about the hitch axis 32 to transfer the desired amount of load from the plow to the hitch means 18. At the same time, the load imposed on the hitch means 18 is transferred through the draft linkage including jack 94 to the rear traction wheels 14 of the tractor. As a result, the desired amount of load is transferred from the plow and hitch means to the traction wheels as well as a desired amount of load which otherwise would act through the front wheels 12 of the tractor, thereby materially increasing the tractive effort of the latter.

Furthermore, once the respective lengths of the jacks 94 and 104 have been selected in accordance with the load to be transferred, the system is operable automatically as aforedescribed to maintain the forces and loads transferred through the jacks substantially constant although the tractor 10, hitch means 18 and plow 38 may pivot relative to each other in a vertical plane about the respective hitch axes 24 and 32. Naturally, since the respective jacks 94 and 104 are connected in parallel to the power unit 120, they may act independently and concurrently with each other to maintain the pressure in the parallel system substantially constant at its predetermined setting and, consequently, the forces and loads transmitted therethrough substantially constant notwithstanding such relative pivotal movement of the components of the combination.

In view of the foregoing, it will now be apparent that the vehicle operator may manipulate a control lever associated with the power unit 120 as shown, by way of example, in the U.S. patent aforementioned to provide a certain amount of load or weight transfer to the rear wheels of a tractor in the event that the ground surface provides good traction. However, if the ground surface does not provide good traction, the operator simply selects more load or weight transfer as required. In any event, irrespective of the amount of load or weight transfer required, the parallel interconnection of the respective jacks 94 and 104 insures that the particular load or weight selected will remain substantially constant until the power unit is manually adjusted to provide a different amount of weight or load transfer.

To further illustrate the significance of the aforedescribed construction, reference will now be made to exemplary load transfer data for a particular combination of tractor, hitch means and implement it, of course, being understood that such data will vary among tractor-implement combinations in accordance with various factors such as the weights of individual components thereof, hitch geometry and the like. Thus, in one such tractor-implement combination not equipped with jack 104 and its connections to the power unit and jack 94 aforedescribed, it was found that application of fluid under pressure of approximately 100 p.s.i. to jack 94 would transfer approximately 259 lbs. of additional load onto the traction wheels of the tractor. The amount of additional load which could be so transferred could be increased to an upper limit of approximately 1,294 lbs. at approximately 500 p.s.i. With the jack 104 installed as aforedescribed, however, considerably more additional weight was capable of transfer to the tractor; that is, approximately 1824 lbs.; 2735 lbs. and 3650 lbs., respectively, at pressures of approximately 1000 p.s.i., 1500 p.s.i. and 2000 p.s.i. Still further increases in the additional load transferred were obtained at the aformentioned pressures by adjusting the hitch geometry between the implement and drawbar as aforedescribed.

While the jacks 94 and 104 have been described as being of the double acting variety, they may, of course, be of the single acting variety while still functioning in the manner aforementioned.

Furthermore, apart from the advantage of transferring plow weight to the traction wheels of a tractor, the present invention has the further advantage of relieving weight from the wheels 58, 64 and 68 of the plow making the later less inclined to sink into the soil and providing more accurate plowing depth.

In the embodiment of FIGURE 5, the hitch plates 128 correspond to plate 34 previously described but may be secured in a single fixed position to the respective plow beams 40 of the plow as previously described with the drawbar 26 connected thereto on the axis 32 all as previously described. This embodiment differs from that of FIGURES 1 through 4 in that the jack 130, corresponding to the jack 104 previously described, includes the cylinder element 132 having one end thereof adapted to be adjustably pivotally mounted by a suitable fastener in any one of a plurality of locations holes 134 in a bracket 136 fixed to plow frame. In similar fashion, one end of the piston element 138 of the jack is adapted to be adjustable pivotally mounted by a suitable fastener in any one of a plurality of locating holes 140 carried by a bracket 142 fixed to drawbar 26. As a consequence, the line of action and moment arm of the jacket 130 may be varied relative to the hitch axis 32 to vary the load transfer geometry between the drawbar 26 and plow 38 in accordance with the size and weight distribution of the latter. Otherwise, operation of the tractor-implement combination equipped with the embodiment of FIGURE 5 is the same as that previously described.

The embodiments of the invention in which an exclusive property or privilege is claimed are defined as follows:

1. In the combination of a wheeled prime mover, a drawn wheeled implement and a drawbar pivotally connected on first and second axes respectively to said prime mover and implement for relative pivotal movement therebetween in a substantially vertical plane; the improvement comprising first load-transfer means operatively connected between said prime mover and drawbar and being operable to transfer load from the latter to said prime mover, second load-transfer means operatively connected between said drawbar and implement and being operable to transfer load from the latter to said drawbar, and control means operable to maintain loads transferred respectively by said first and second load-transfer means substantially constant during pivotal movement of said prime mover, implement and drawbar relative to each other about said axes.

2. In the combination of a wheeled prime mover, a drawn wheel implement and a drawbar pivotally connected on first and second horizontal transverse axes respectively to said prime mover and implement for relative pivotal movement therebetween in a substantially vertical plane; the improvement comprising first load-transfer means operatively connected between said prime mover and drawbar and being operable to transfer load from the latter to said prime mover while permitting relative pivotal movement therebetween about said first axis, second load-transfer means operatively connected between said drawbar and implement and being operable to transfer load from the latter to said drawbar while permitting relative pivotal movement therebetween about said second axis, and control means operable to maintain the loads transferred respectively by said first and second load-transfer means substantially constant during pivotal movement of said prime mover, implement and drawbar relative to each other about said axes.

3. In the combination of a wheeled prime mover, a drawn wheeled implement and a drawbar having longitudinally spaced portions thereof respectively pivotally connected on first and second horizontal transverse axes to said prime mover and implement for relative pivotal movement therebetween in a substantially vertical plane; the improvement comprising first extensible and retractable load-transfer means operatively pivotally connected between said prime mover and drawbar and being operable to transfer load from the latter to said prime mover while permitting relative pivotal movement therebetween about said first axis, second extensible and retractable load-transfer means operatively pivotally connected between said drawbar and implement and being o to transfer load from the latter to said draw mitting relative pivotal movement therebetween about said second axis, and control means operatively interconnecting said first and second load-transfer means and being operable automatically to maintain the loads respectively transferred thereby substantially constant during pivotal movement of said prime mover, implement and drawbar relative to each other about said axes.

4. The combination according to claim 3 wherein said first and second load-transfer means respectively comprise first and second jack means including relatively reciprocable piston and cylinder elements, and wherein said control means comprises means automatically simultaneously controlling relative reciprocation of said elements of said respective jack means during pivotal movement of said prime mover, implement and drawbar relative to each other about said axes.

5. The combination according to claim 3 wherein said first and second load-transfer means respectively comprise first and second fluid pressure operated jack means including relatively reciprocable piston and cylinder elements, and wherein said control means comprises a fluid pressure control system, and means connecting said first and second jack means in parallel to said system to automatically maintain a substantially constant pressure within said respective jack means during pivotal movement of said prime mover, implement and drawbar relative to each other about said axes.

6. The combination according to claim 5 further comprising means adjustably pivotally connecting said respective elements of said second jack means in a plurality of positions to said implement and drawbar to vary the moment arm of the force applied by said second jack means relative to said second axis.

7. The combination according to claim 3 wherein said first load-transfer means comprises draft linkage means operatively pivotally connected between said drawbar and prime mover, first fluid pressure operated jack means including relatively reciprocable position and cylinder elements operatively pivotally connected between said linkage means and prime mover, said second load-transfer means comprising second fluid pressure operated jack means including relatively reciprocable position and cylinder elements operatively pivotally connected between said drawbar and said implement, said control means comprising a fluid pressure control system, and means connecting said first and second jack means in parallel to said system to automatically maintain a substantially constant pressure within said respective jack means during pivotal movement of said prime mover, implement and drawbar relative to each other about said axes.

8. The combination according to claim 3 wherein said drawbar is pivotally connected to said implement on said second axis through a hitch member, and means adjustably mounting said hitch member on said implement for movement between a plurality of fixed positions relative thereto to vary the vertical angle between said implement and said drawbar about said second axis.

9. The combination according to claim 3 further comprising means adjustably pivotally connecting said second load-transfer means in a plurality of positions to said implement and drawbar to vary the moment arm of the force applied by said second load-transfer means relative to said second axis.

10. In the combination of a prime mover having traction wheels, a drawn wheeled implement, a drawbar, and means pivotally connecting longitudinally spaced portions of said drawbar on first and second horizontal transverse axes respectively to said prime mover and implement for relative pivotal movement therebetween in a substantially vertical plane; the improvement comprising first load-transfer means operatively connected between said prime mover and drawbar and being operable to transfer load from the latter to said traction wheels of said prime mover while permitting relative pivotal movement between said prime mover and drawbar about said first axis, second load-transfer means, means operatively connecting said second load-transfer means to said drawbar and implement, said second load-transfer means being operable to transfer load from said implement to said drawbar while permitting relative pivotal movement therebetween about said second axis, and control means operable to maintain the loads transferred respectively by said first and second load-transfer means substantially constant during pivotal movement of said prime mover, implement and drawbar relative to each other about said axes.

11. In the combination of a prime mover having traction wheels, a drawn wheeled implement, a drawbar, and means pivotally connecting longitudinally spaced portions of said drawbar on first and second horizontal transverse axes respectively to said prime mover and implement for relative pivotal movement therebetween in a substantially vertical plane; the improvement comprising first extensible and retractable load-transfer means operatively connected between said prime mover and drawbar and being operable to transfer load from the latter to said traction wheels of said prime mover while permitting relative pivotal movement between said prime mover and drawbar about said first axis, second extensible and retractable load-transfer means, means operatively connecting said second load-transfer means to said drawbar and implement, said second load-transfer means being operable to transfer load from said implement to said drawbar while permitting relative pivotal movement therebetween about said second axis, and control means operatively interconnecting said first and second load-transfer means and being operable automatically to maintain the loads respectively transferred thereby substantially constant during pivotal movement of said prime mover, implement and drawbar relative to each other about said axes.

12. The combination according to claim 11 wherein said first and second load-transfer means respectively comprise first and second fluid pressure operated jack means including relatively reciprocable piston and cylinder elements, and wherein said control means comprises a fluid pressure control system, and means connecting said first and second jack means in parallel to said system to automatically maintain a substantially constant pressure within said respective jack means during pivital movement of said prime mover, implement and drawbar relative to each other about said axes.

13. The combination according to claim 12 wherein said first and second jack means are each double acting.

14. The combination according to claim 11 wherein said means operatively pivotally connecting said second load-transfer means to said drawbar and implement comprises means for adjusting the respective connections of said second load transfer means to said drawbar and implement among a plurality of fixed positions to vary the moment arm of the force applied by said second load-transfer means relative to said second axis.

15. The combination according to claim 11 wherein said means pivotally connecting said drawbar to said implement about said second axis comprises a hitch member, and means adjustably mounting said hitch member on said implement for movement between a plurality of fixed positions relative thereto to vary the vertical angle between said implement and said drawbar about said second axis.

References Cited by the Examiner
UNITED STATES PATENTS 2,360,902   10/1944   Simmons _____ 280—406
2,627,796   2/1953   Bunting _____ 280—405 X BENJAMIN HERSH, *Primary Examiner.*

LEO FRIAGLIA, *Examiner.*